(No Model.)  2 Sheets—Sheet 1.
W. G. READ.
ALMOND HULLING AND SHELLING MACHINE.
No. 505,002. Patented Sept. 12, 1893.
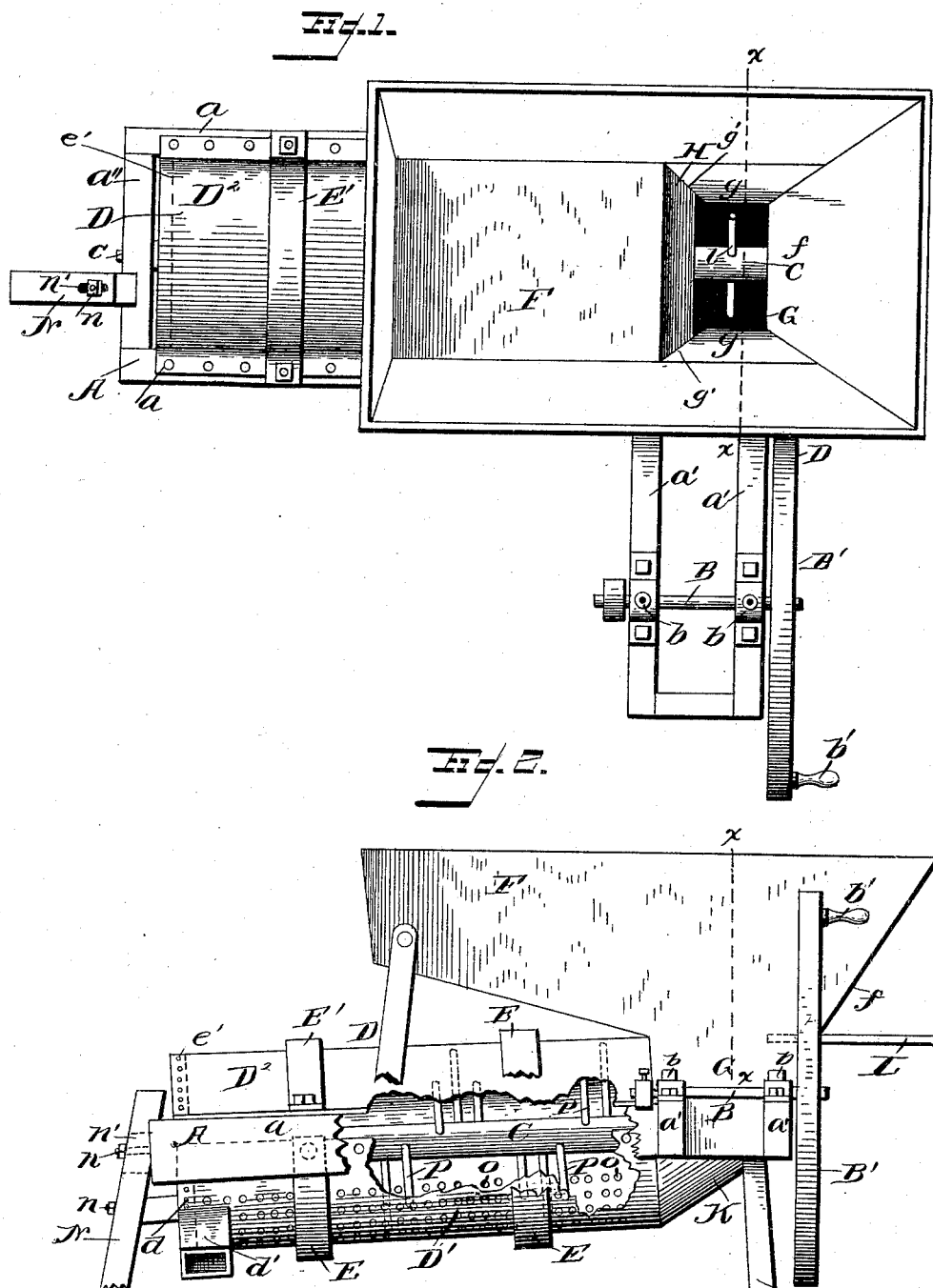
Witnesses:
J. B. McGirr.
W. F. Bernhard
Inventor:
Walter G. Read
By his Attorneys,
Edson Bros.

(No Model.) 2 Sheets—Sheet 2.
W. G. READ.
ALMOND HULLING AND SHELLING MACHINE.
No. 505,002. Patented Sept. 12, 1893.
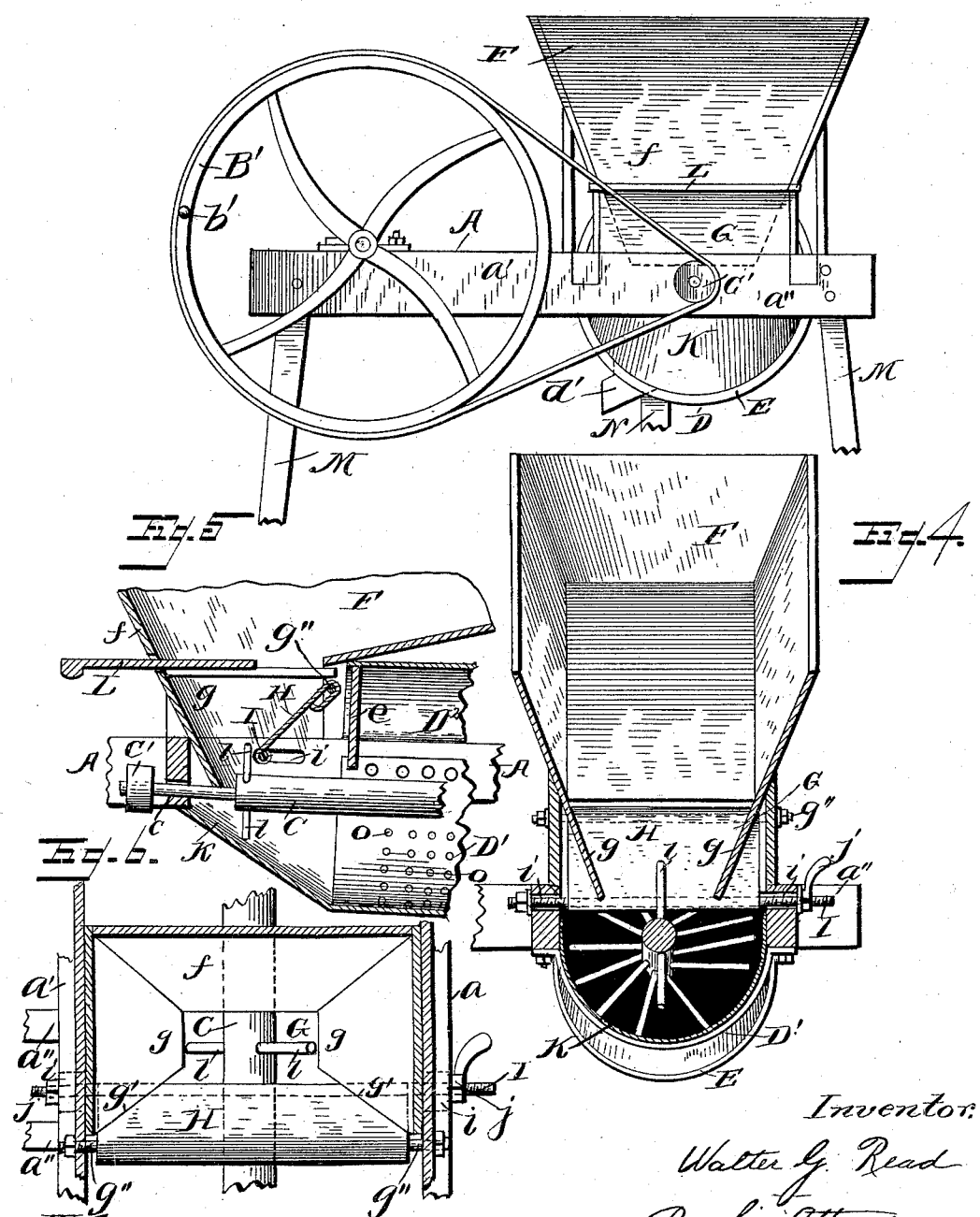

UNITED STATES PATENT OFFICE.

WALTER G. READ, OF COLUSA, CALIFORNIA.

ALMOND HULLING AND SHELLING MACHINE.

SPECIFICATION forming part of Letters Patent No. 505,002, dated September 12, 1893.

Application filed August 30, 1892. Serial No. 444,570. (No model.)

*To all whom it may concern:*

Be it known that I, WALTER G. READ, a citizen of the United States, and a resident of Colusa, in the county of Colusa and State of California, have invented certain new and useful Improvements in Almond Hulling and Shelling Machines; and I do hereby declare the following to be a full, clear, and exact description of the invention, such as will enable others skilled in the art to which it appertains to make and use the same.

The object of the present invention is to provide simple means for automatically removing the hull from almond nuts without injury to the shell, or to remove the hull and shell, or the shell of "paper-shell" almonds, without serious injury to the kernel or edible substance of the nut; the machine being easily adapted for service on different kinds of almond nuts. These objects are attained by the mechanisms embodying my invention illustrated in the accompanying drawings, in which—

Figure 1 is a plan view. Fig. 2 is a side elevation, with part of the fixed drum broken away to illustrate the interior thereof. Fig. 3 is an end elevation. Fig. 4 is a vertical transverse section through the hopper and feed throat on the plane indicated by the dotted line $x$—$x$ of Figs. 1 and 2. Figs. 5 and 6 are detail views of parts of my improvements.

Like letters denote corresponding parts in all the figures of the drawings, referring to which—

A designates the main carrying frame of my improved machine for hulling and shelling almond nuts, said frame comprising the parallel side bars $a$, the long cross bars $a'$ and the end bars $a''$ $a''$, all united rigidly together in any desirable way. The long cross bars $a'$, $a'$, extend some distance to one side of the side bars $a$, and are designed to support the means whereby power is communicated to the machine, which power mechanism in the present instance comprises a short shaft B, journaled in bearings $b$ on the cross bars $a'$, and a balance pulley B' rigid with said shaft and provided with a hand crank $b'$ adapted to be grasped by hand to turn the wheel and shaft, although power from a suitable motor or shafting can be transmitted to the shaft to drive the same if preferred.

C designates the spiked or toothed shaft designed to operate on the almond nuts to remove the hull, or the hull and shell, therefrom. This shaft is arranged longitudinally of the main carrying frame A, and is journaled in suitable fixed bearings $c$ thereon. This shaft is positively driven at the required speed through a belt or equivalent gearing D, said belt passing around the balance pulley B and a small pulley C' rigidly secured to one end of the spiked shaft C, see Figs. 1 and 3. This shaft C operates in a fixed drum D supported by the main carrying frame, the drum and shaft being arranged concentric with each other and supported by the main frame in fixed relation to each other so as to occupy the same relative positions at all times. The drum extends nearly the entire length of the side bars $a$, of the main frame, that is to say, from one end bar $a''$ to the adjacent cross bar $a'$; and said drum may be constructed in one piece but I prefer to make the same in two pieces, the upper one of which is removable for the purpose of having ready access to the interior of the drum. The lower section D' of the drum has its upper edges rigidly united to the middle of the side bars $a$ $a$, of the main frame A, and the rear end of said lower section is closed by means of a fixed semi-circular head $d$, indicated by dotted lines in Fig. 2. An opening is provided in the side or lower part of the drum at its rear end for the discharge of the nuts into the inclined delivery chute $d'$ fixed to the lower side of the drum or to the frame A in position to receive from the drum, as is obvious. To keep the lower section D' in true concentric position relative to the spiked shaft C, I provide means for stiffening the lower drum section at intermediate points of its length, which means consists of the spaced circumferential bands E fitted closely against the outside of the section D' and fastened at their ends to the side bars $a$, $a$, of the main frame.

The upper section D² of the drum is detachably secured at its edges to the side bars $a$, $a$, of the frame in any desirable way, and it is provided at its opposite ends with the fixed semi-circular heads $e$, $e'$, and with the external reinforce bands E'. The lower semicircular head $e'$ is represented by dotted lines in Figs. 1 and 2, and it corresponds to and aligns with the head *d* at the rear end of the lower section D' of the drum. The circumferential reinforcement bands E' are removably bolted to the main frame, as shown, to enable them to be removed with the upper section D² and which serves to reinforce said upper drum section D². It will be seen that the upper section D² of the drum has its front and rear ends closed by the fixed heads, while the lower section is closed, by a head, only at its rear end, the front end of said lower section being open to permit the nuts from the hopper and feed throat to pass into the drum where they are acted upon by the spikes or teeth on the revoluble shaft C.

The nuts are placed, in their whole condition as gathered from the orchard, into a hopper F mounted rigidly on the main frame A of the machine. This hopper has the usual inclined sides, and the front wall thereof is extended between the long cross bars *a'*, *a'*, the lower extended end of the front of the hopper being indicated at *f*.

Within the lower contracted part of the hopper is provided the feed throat G, formed by the extended end *f* of the hopper, the inclined boards *g*, *g*, and the gate valve H. The inclined boards *g* are secured to the sides of the hopper, with one end abutting against the extension *f*, and the other ends provided with the bevels *g'*; and the adjustable gate-valve H is pivoted to swing toward or from the beveled ends of the throat walls *g*, *g*, to vary the area or size of the opening provided by the feed-throat for the passage of the nuts therethrough. This gate valve is hung at its upper edge, preferably by means of a bolt *g''* which is fixed in the side walls of the hopper; and the gate can be held in the desired adjusted position by means of a longitudinal bolt I which passes through a turned up flange or loop on the lower edge of the gate-valve. The ends of this adjusting bolt pass through slots *i*, *i*, provided in the side bars *a*, *a*, of the main frame, and the threaded ends of said bolt receive the clamping nut or nuts *j* adapted to bind against the side bars, as shown in Fig. 4. It is evident that the gate valve can be moved toward or from the throat-walls, to enlarge or diminish the size of the opening in the throat, and that the gate-valve can be held in its adjusted position by tightening the nut or nuts *j* on the adjusting bolt.

Below the feed throat I provide the inclined feed chute K, which extends from the outside cross bar to the inner end of the lower section D' of the drum; and this feed chute is curved in cross section to conform to the lower half of the drum. This chute serves to conduct the nuts from the hopper and feed throat to the drum.

Above the feed throat of the hopper, I provide a cut off slide L which operates in suitable guides in the hopper, and by closing this slide across the hopper the supply of nuts to the feed throat can be cut off.

The nuts are kept in a constant state of agitation and prevented from clogging in the feed throat by the agitator finger or fingers *l* which are attached to the shaft C and project therefrom into the feed throat to operate within the same and cause the nuts to pass freely from the throat into the drum. The drum and shaft are arranged in a slightly inclined horizontal position to cause the hulls and nuts to properly pass toward the rear end of the drum and into the delivery spout, and to regulate the rate of discharge of the contents of the drum I provide means for changing the horizontal inclination of the drum and shaft, these parts being maintained in their relative fixed positions.

The frame A of the machine is supported at one end by the pair of fixed legs M, M, and at its other end said frame has a single supporting leg N which is adjustably fixed to the frame by means of a bolt (or bolts) *n* which passes through a longitudinal slot *n'* in the leg and is fixed to the end bar *a''* of said frame, whereby the rear end of the frame can be raised or lowered by moving the bolt in the slot in the leg and thus vary the horizontal inclination of the drum, for the purpose described.

To facilitate the discharge of the dust and small particles of hull or shell from the drum, I provide the lower section D' of the drum with a multiplicity of small perforations or holes *o* as shown in the drawings, through which perforations is free to pass the dust while the nuts are being operated by the spikes on the shaft C in the drum.

The spikes or teeth are designated by the letter P, and they are fixed in any suitable way to the periphery of the shaft throughout the length of the cylinder. Said spikes extend from the shaft nearly to the inner surface of the drum, sufficient space being left between the spikes and the drum for proper clearance of the spikes; and as these spikes operate so closely to the drum it is important that the drum shall be kept true and concentric with the shaft, hence I provide the external reinforce bands.

In order to cause the nuts to pass from front to rear of the drum, I arrange the spikes or teeth on the drum in spiral lines or series, and when the shaft is positively rotated as specified the spikes act to remove the hull, or break the shell, and at the same time force or feed the nuts positively toward the rear end of the drum, the feed being facilitated by the inclination and the rate of the travel thereof being regulated by the inclination of the drum and the speed of the shaft.

This being the construction of my machine, the operation may be described as follows:—After the nuts have been placed in the hopper, the gate-valve adjusted in the feed-throat, and the shaft C started to revolve, the cut off slide is pulled out the proper distance to permit the nuts to pass from the hopper through the feed throat, onto the inclined chute, and thence into the drum. The agitator finger on the shaft prevents the nuts from lodging and clogging the feed throat; and the teeth or spikes on the shaft operate on the nuts to remove the hull from the shells, or to crush the shell, according to the speed of the shaft, and at the same time the spikes on the shaft and the inclination of the drum cause the nuts to travel toward the delivery spout, where the kernels, hulls and shells are discharged while the dust and fine particles pass through the perforations in the lower half of the drum. The supply of nuts to the hopper can be regulated by adjusting the gate-valve, and the supply can be wholly shut off by closing the slide.

I attach importance to the drum adapted to be adjusted to different horizontal inclinations as it has been found by practical experience that certain classes of almond nuts require more strokes of the teeth, of a given force, to remove the hulls therefrom than other grades of nuts, and hence it is necessary that such almond nuts shall be retained longer in the drum and thereby subjected to the action of the teeth or spikes for a longer time in order to properly remove the hulls. By properly regulating the rate of feed supply through the feed throat, the rotation of the shaft and teeth, and the inclination of the drum, the agitation and action of the teeth or spikes on the nuts can be so governed as to obtain the best hulling results on the different varieties of almond nuts, and soft or paper shell almonds can be shelled without seriously mutilating the kernels.

Having thus fully described my invention, what I claim as new, and desire to secure by Letters Patent, is—

1. In an almond hulling or shelling machine, the combination with a suitable frame, and a hopper mounted thereon, of the horizontally-inclined cylindrical drum having a continuous single chamber extending from end to end thereof and communicating at its upper end with said hopper, the longitudinal shaft arranged concentrically within the drum and carrying the radial spikes or teeth which terminate near the inner surface of the drum and operate to forcibly strike the nuts therein, and mechanism for rotating the shaft at a high rate of speed to cause the teeth thereon to remove the hulls or shells by the impact of said teeth on the nuts, substantially as and for the purpose described.

2. In an almond hulling or shelling machine, the combination with a frame having a suitable support at one end, and a hopper mounted thereon, of the horizontally-inclined cylindrical drum having a single continuous chamber extending from end to end thereof and arranged to receive the nuts at its upper end from said hopper, a longitudinal shaft arranged concentrically within the drum and carrying the spirally arranged crushing spikes or teeth which terminate near the periphery of the drum, mechanism for rotating said shaft at a high rate of speed and cause the spikes to have sufficient impact against the nuts to remove or crush the hulls or shells of the nuts, and a vertically adjustable supporting leg connected to the frame at the lower end of the drum, whereby the inclination of said drum can be varied to regulate the passing of the nuts through the drum and cause the nuts to be subjected to the action of the spikes for a longer or shorter time, as set forth.

3. In a machine for hulling or shelling almond nuts, the combination with the frame having the fixed legs at one end, and a hopper mounted on the frame, of the horizontally inclined cylindrical drum having a single continuous chamber extending from end to end thereof and provided with the discharge opening at its lower end, the longitudinal shaft journaled in said frame to extend through the drum, concentric therewith, and provided with the spirally arranged crushing spikes or teeth, mechanism for rotating the shaft at a high rate of speed to cause the spikes to have sufficient impact against the nuts to remove or crush the hulls or shells, the supporting leg N arranged at the end of the frame contiguous to the lower end of said drum and provided with the longitudinal slot in its upper end, and the bolt which fastens the leg to the frame, for the purpose described, substantially as set forth.

4. In a machine for hulling and shelling almond nuts, the combination with a frame, and a hopper supported directly thereby and provided with a contracted depending feed throat, of a cylindrical drum D comprising the upper and lower semi-cylindrical sections independently secured to the frame at one side of the hopper, the upper section having both of its ends closed and the lower section being closed at its rear end and provided at its open front end with the inclined feed chute K that lies below the feed throat of said hopper, and a longitudinal spiked shaft C extending centrally through said cylindrical drum and the feed throat, substantially as and for the purpose described.

5. In a machine for hulling and shelling almond nuts, the combination with a frame, of the hopper F supported near one end of the frame and provided with the depending feed throat G and the inclined chute K, of the horizontally-inclined cylindrical drum D having its sections independently secured to the frame and arranged with its upper open end contiguous to the feed throat and chute to receive directly therefrom, the longitudinal shaft extending concentrically through said cylindrical drum and provided with the crushing spikes within the drum and with the agitator finger within the feed throat, and mechanism for rotating the shaft at a high rate of speed to cause its spikes to have sufficient impact against the nuts to crush the hulls or shells of the nuts in the drum, substantially as described.

6. A machine for hulling or shelling almond nuts, comprising a frame, the hopper supported thereon at one end and provided with the depending feed throat and the chute K, the sectional cylindrical drum having its sections independently secured to the frame at one side of the hopper and each section of the drum provided with the circumferential stiff bands, the lower half of said drum being perforated and provided with the discharge spout and the upper open end of the drum communicating with the feed throat and chute of the hopper, and the longitudinal spiked shaft extending through the drum and the feed throat, substantially as and for the purpose described.

7. In a machine for hulling or shelling almond nuts, the combination with a frame, and a drum supported thereby, of the hopper having one of its side walls extended downward at $f$ into the feed throat, the inclined boards $g, g$, fixed in the feed throat on opposite sides thereof and each having one edge abutting against the wall $f$ and with its other edge beveled at $g'$, the gate valve H pivoted in the feed throat at one side of the walls $g$, $g$, and adapted to be moved toward or from the beveled edges $g'$ thereof, and a spiked shaft extending through the feed throat and the drum, substantially as and for the purpose described.

8. In a machine for hulling or shelling almonds, the combination of a main frame having the longitudinal slots in its side bars, the drum, a hopper, the feed throat formed in the lower part of the hopper by the inclined walls having the beveled edges, the gate-valve hung in the hopper to swing toward or from the beveled edges of the throat-walls, a securing bolt carried by the lower part of the gate-valve and having its ends fitted in the slots of the frame and the clamping-nuts, and a spiked shaft in the drum, substantially as described.

In testimony whereof I affix my signature in presence of two witnesses.

WALTER G. READ.

Witnesses:
S. R. MURDOCK,
JOHN C. MOYK.